May 17, 1960     J. K. PENNELL, JR     2,936,531
DEVICE FOR TEACHING DECIMAL POSITIONS IN LONG DIVISION
Filed Oct. 17, 1958
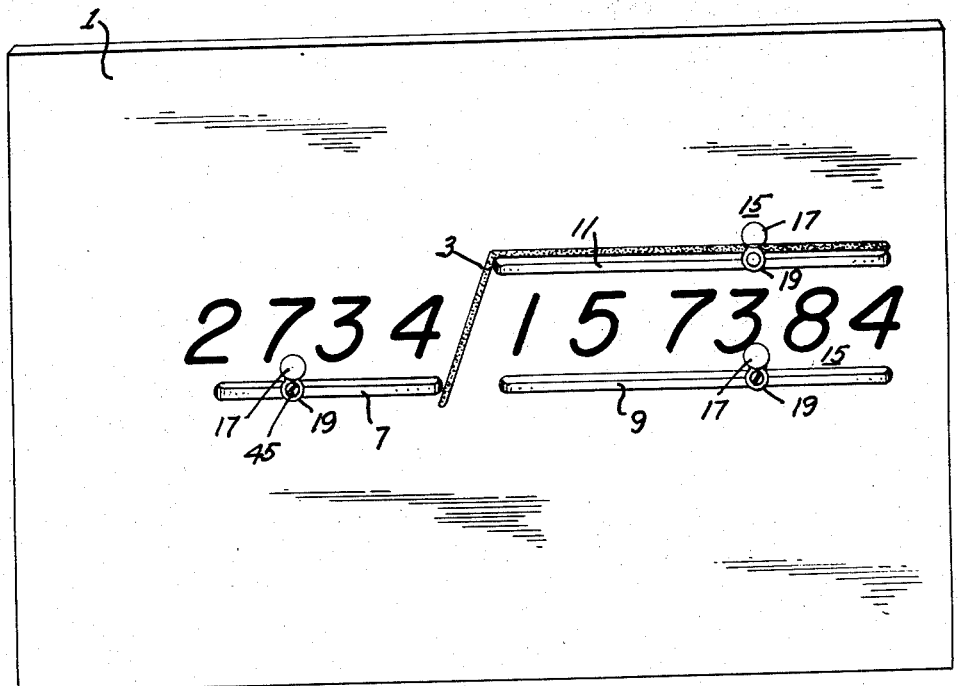
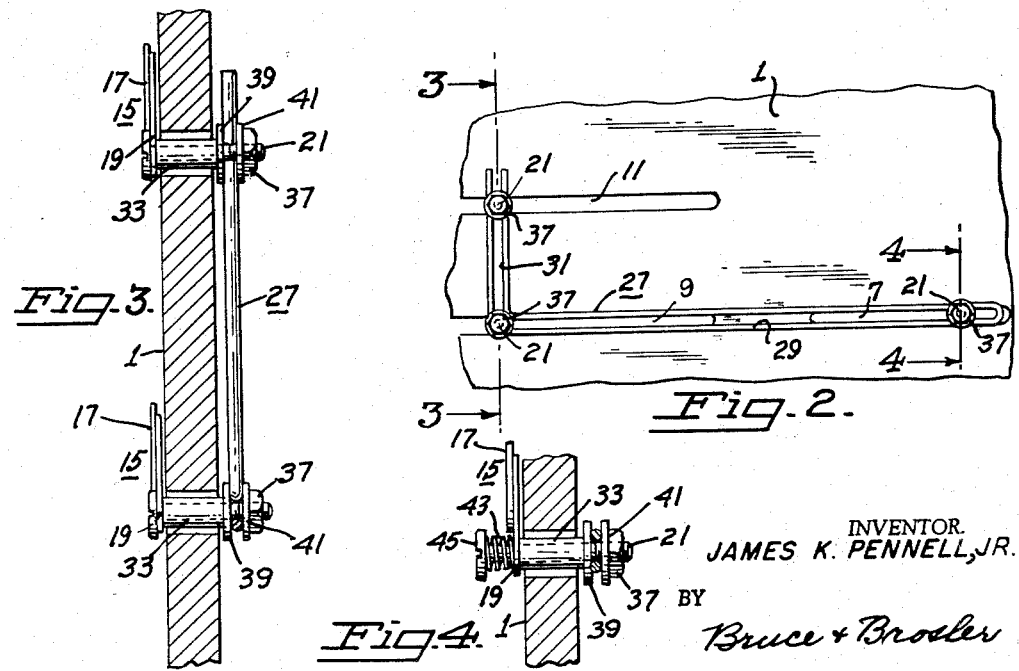
INVENTOR.
JAMES K. PENNELL, JR.
BY Bruce & Brosler
HIS ATTORNEYS

United States Patent Office 2,936,531
Patented May 17, 1960

2,936,531
DEVICE FOR TEACHING DECIMAL POSITIONS IN LONG DIVISION

James K. Pennell, Jr., Orinda, Calif.

Application October 17, 1958, Serial No. 767,882

4 Claims. (Cl. 35—31)

My invention relates to instruction means and more particularly to a teaching device for the instruction of pupils in the long division of numbers involving decimals.

In the matter of teaching long division to pupils, the problem of instructing such pupils in the clearing of decimal points from the divisor, where decimal points are involved, has always been a rather difficult one.

The present invention has for its principal object to provide a novel and improved mechanical device for visually portraying the manner of handling decimal points in solving problems of long division involving decimals.

Another object of the present invention is to provide a device for such purpose which is of simple construction and can be manufactured economically.

Additional objects of my invention will be brought out in the following description of a preferred embodiment of the same, taken in conjunction with the accompanying drawings, wherein Figure 1 is frontal view of a device embodying the present invention;

Figure 2 is a rear view of the pertinent portion of the device of Figure 1;

Figure 3 is fragmentary view in section, taken in the plane 3—3 of Figure 2;

Figure 4 is a fragmentary view in section, taken in the plane 4—4 of Figure 2.

Referring to the drawings for details of my invention in its preferred form, the device involves a board 1 having a plane surface, preferably one for use with chalk. This board may have a long division symbol 3 permanently portrayed thereon, though this is not essential as the same can be applied with chalk when utilizing the device for its intended purpose.

The board, however, is provided with slots 7, 9 and 11 underlying the relative positions to be occupied by the divisor, dividend and quotient respectively, in demonstrating a problem of long division.

A decimal point symbol 15 which may take the form of a small disk 17 having a tab 19 extending therefrom, has a stem 21 extending from the tab and passing through the divisor slot 7. A similar decimal point symbol has its stem passing through the dividend slot 9, while a third decimal point symbol has its stem passing through the quotient slot 11, the latter two decimal point symbols being in vertical alignment with respect to each other.

Behind the board and movable with respect thereto is means for interconnecting the protruding ends of the stems of the various decimal point symbols whereby all decimal point symbols may be shifted simultaneously in their respective slots.

Such connecting means may take the form of an L-shaped loop 27 of heavy wire disposed with the long arm 29 of the loop running along the divisor and dividend slots, and with the short arm 31 extending vertically behind the dividend decimal symbol and the quotient decimal symbol.

In attaching the various decimal point symbols to this interconnecting loop, each of the decimal point symbols is preferably provided with a roller sleeve 33 not only to facilitate shifting of the decimal symbols in their respective slots, but also to facilitate the connection of the stems 21 to the connecting means, which is accomplished by passing the stem through the loop and threading a nut 37 on the exposed end thereof. Washers 39, 41 may be disposed on either side of the loop in connecting the decimal point symbol thereto.

Both the dividend decimal point symbol and the quotient symbol are fixed to their respective stems 21 and consequently are fixedly secured to the interconnecting loop.

The connection of the divisor symbol, on the other hand, is made to be releasable. This is accomplished by providing a stem in the form of a pin passing through the tab of the symbol, and inserting a small compression spring 43 between the head 45 of such pin and the tab 19 of the symbol, the connection between the divisor decimal point symbol and the interconnecting loop then being releasable merely through application of finger pressure to the head of the pin. When thus depressed, the divisor decimal point symbol may be manually shifted in its slot 7 independently of the other two decimal point symbols.

In using the device in the instruction of children in problems of long division involving decimals, any selected numbers are written in the positions to be occupied by the dividend and the divisor following which, the connecting means behind the board may be shifted to bring the dividend decimal point symbol to any desired position with respect to the digits of the dividend number thus establishing a dividend with a decimal point desirably located. When this has been done, the decimal point symbol of the divisor may then be individually shifted to locate it with respect to the digits of the divisor number. This completes the setting up of the problem to be solved.

As the first step in the solution of such a problem, it becomes necessary to instruct the pupils how to clear the decimal point from the divisor, and the merits of the present device reside in the fact that this can be very simply and visually accomplished by merely shifting the connecting means behind the board, sufficiently to move the decimal point symbol of the divisor to a position just beyond the last digit of this number.

While this is being done, the pupil's attention is directed to the fact that the decimal point symbol of the dividend is simultaneously moved a corresponding number of digits in the same direction, and that the decimal point symbol of the quotient will appear directly above the new position occupied by the decimal point symbol of the dividend.

Thus through such simple visual demonstration, made possible by the teaching device of the present invention, the problem of instructing children in this normally puzzling operation is reduced to utmost simplicity.

While I have disclosed my invention in its preferred form, the same is subject to alteration and modification without departing from the underlying principles involved and while I have illustrated and described the same in its preferred form and in considerable detail, I accordingly do not desire to be limited in my protection to the specific details so illustrated and described except as may be necessitated by the appended claims.

I claim:

1. A device for instruction of pupils in the division of numbers involving decimals, comprising a board having related areas for a divisor, dividend and quotient in a problem of long division, a plurality of decimal point symbols, one for each of the divisor, dividend and quotient areas, means carried by said board and movable in a plane paralleling the surface of said board and supporting said decimal point symbols for simultaneous movement with respect to such divisor, dividend and quotient areas, and means permitting relative shifting between the decimal point symbol in the divisor area and the remaining two decimal point symbols as to their positions on said supporting means.

2. A device for instruction of pupils in the division of numbers involving decimals, comprising a board, said board having slots underlining the relative positions of the divisor, dividend and quotient, in a problem of long division, a decimal point symbol having a stem passing into the divisor slot, a decimal point symbol having a stem passing into the dividend slot, and a decimal point symbol having a stem passing into the quotient slot, said last two symbols being in vertical alignment, means interconnecting said decimal point symbols for simultaneous shifting of said decimal point symbols in their respective slots in response to movement of said interconnecting means, said divisor decimal point symbol having a releasable connection to said interconnecting means to permit of a positional adjustment thereof in its slot independently of the other decimal point symbols.

3. A device for instruction of pupils in the division of numbers involving decimals, comprising a board, said board having slots underlining the relative positions of the divisor, dividend and quotient, in a problem of long division, a decimal point symbol having a stem passing through the divisor slot, a decimal point symbol having a stem passing through the dividend slot, and a decimal point symbol having a stem passing through the quotient slot, said last two symbols being in vertical alignment, means behind said board and interconnecting said stems for simultaneous shifting of said decimal point symbols in their respective slots in response to movement of said interconnecting means, said divisor decimal point symbol having a releasable connection to said interconnecting means to permit of a positional adjustment thereof in its slot independently of the other decimal point symbols.

4. A device for instruction of pupils in the division of numbers involving decimals, comprising a board, a long division symbol displayed on said board, said board having slots underlining the relative positions of the divisor, dividend and quotient, in a problem of long division, a decimal point symbol having a stem passing through the divisor slot, a decimal point symbol having a stem passing through the dividend slot, and a decimal point symbol having a stem passing through the quotient slot, said last two symbols being in vertical alignment, means behind said board and interconnecting said stems for simultaneous shifting of said decimal point symbols in their respective slots in response to movement of said interconnecting means, said divisor decimal point symbol having a releasable connection to said interconnecting means to permit of a positional adjustment thereof in its slot independently of the other decimal point symbols.

References Cited in the file of this patent

UNITED STATES PATENTS

| | | |
|---|---|---|
| 651,275 | Seiler | June 5, 1900 |
| 2,527,080 | Rickard et al. | Oct. 24, 1950 |
| 2,804,699 | Robinson | Sept. 3, 1957 |